United States Patent Office 3,315,310
Patented Apr. 25, 1967

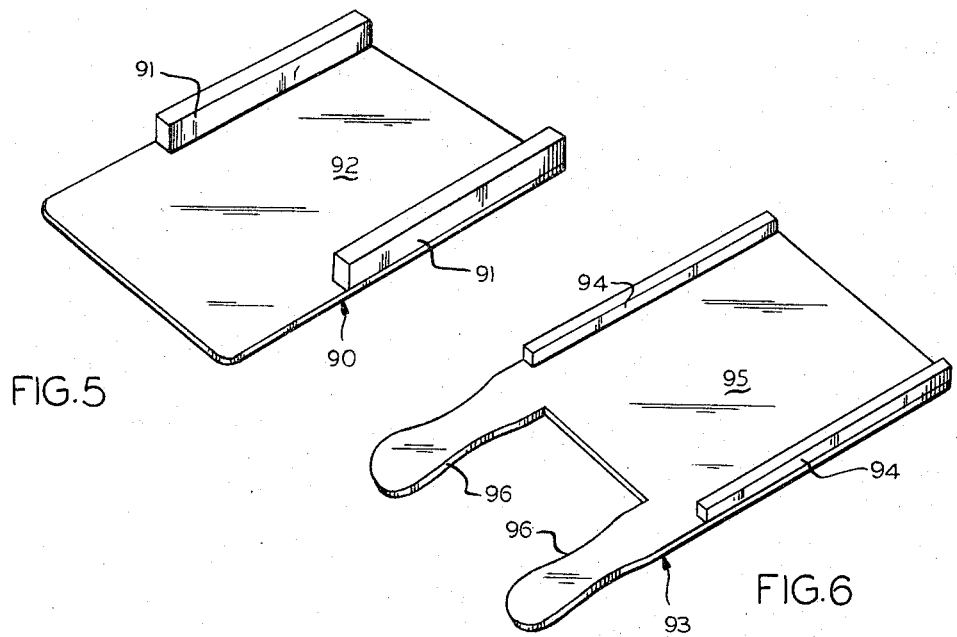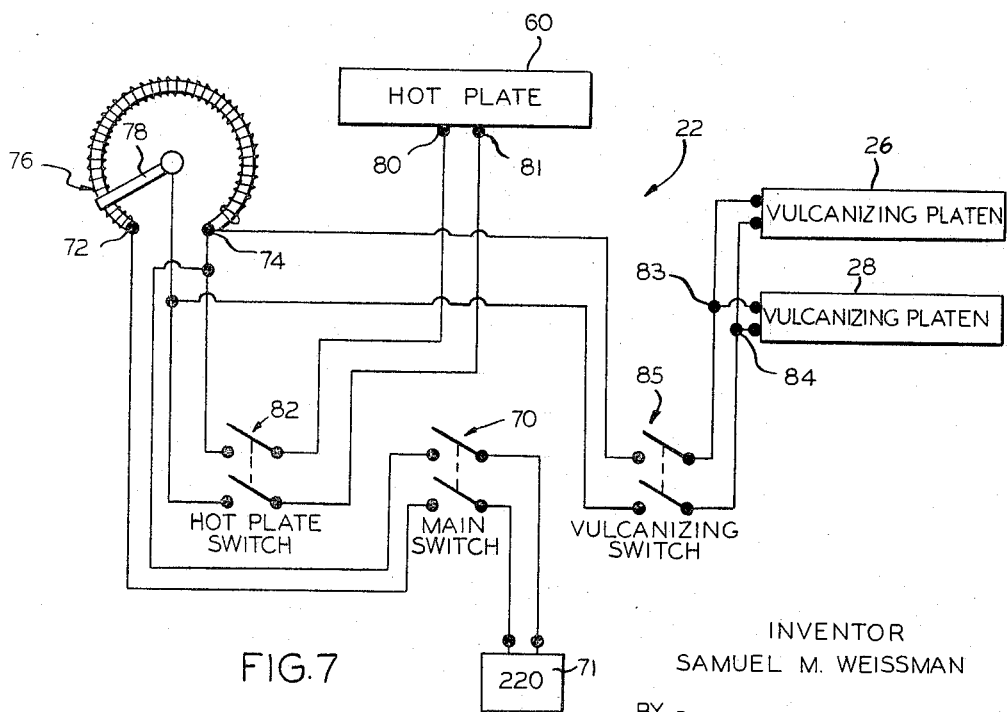

3,315,310
MACHINE FOR MANUFACTURING PRE-INKED DIES
Samuel M. Weissman, Chicago, Ill., assignor to Bankers and Merchants, Inc., Chicago, Ill.
Filed Mar. 11, 1965, Ser. No. 439,004
8 Claims. (Cl. 18—17)

This invention relates generally to machines used for manufacturing dies from flexible type material and more particularly to machines for manufacturing molds and/or dies. Still more particularly, this invention relates to machines for manufacturing pre-linked dies in the form of an embossed porous stamp from porous rubber-like material.

Pre-inked dies referred to in the description of the embodiment herein relates to a porous rubber-like material having embossed characters and used as an ink stamp. After being saturated with ink, this type of stamp, because of the pores throughout, could be successively used for a substantial number of times before refilling it again.

The material for the pre-inked dies previously used was normally required to be initially placed into its molten state before embossing characters thereon from a master mold. Recently, it was discovered that pre-inked dies could be produced from a porous rubber-like material without placing the same in a molten state. The prior type machines for manufacturing pre-inked dies were required specifically to produce dies from molten material and were not capable nor adaptable for use when this requirement was no longer necessary.

It is therefore an important object of this invention to provide a machine that is constructed and adapted to provide a pre-inked die. It is a related object to provide a machine for manufacturing pre-inked dies that does not require the material for the die to be placed into a molten state.

It is another object of this invention to provide a machine for manufacturing pre-inked dies that is also adaptable to form the master mold for the pre-inked dies.

It is a feature of this invention to provide a hot plate which is adaptable for thoroughly heating only the face of a master mold and to have substantially no effect at the extreme depth of the character indentations within the master mold.

It is another feature to provide a mechanical power means that evenly distributes the force throughout a platen member which presses against the die and master mold material.

For the purpose of facilitating an understanding of the invention, the accompanying drawings illustrate a preferred embodiment thereof, from an inspection of which, when considered in connection with the following description, the invention and its mode of construction assembly and operation, objects, features and many advantages can be readily understood and appreciated.

Referring to the drawings in which like characters of reference indicate corresponding or similar parts throughout the several figures of the drawings:

FIG. 5 is a pictorial view of the galley which is used when making the mold for the pre-inked dies;

FIG. 6 is a pictorial view of the tray wherein the mold and the pre-inked slab material are placed; and FIG. 7 shows the electrical diagram for supplying electrical power to the hot plate and the platens.

Figure 1:
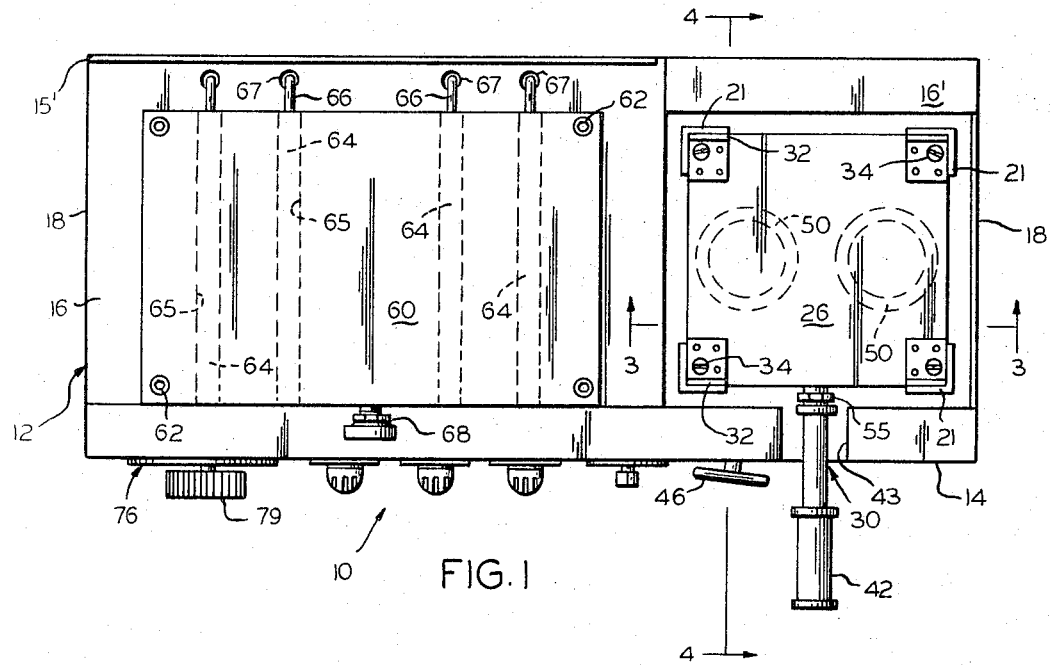
FIG. 1 is a top view of the machine for manufacturing pre-inked dies embodying the principles of the invention and having the cover over the mechanical press removed.
Figure 2:
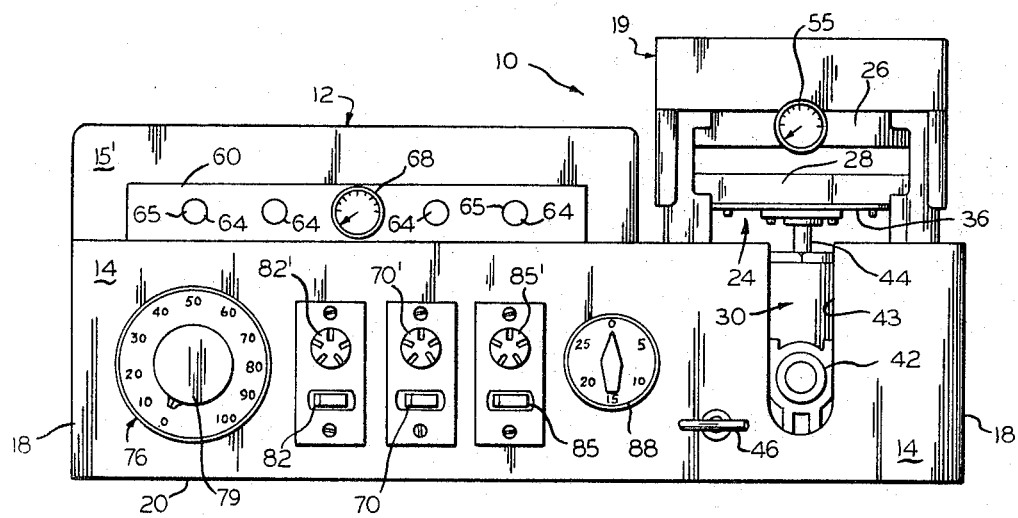
FIG. 2 is a front elevational view and having the cover extending over the mechanical press.

Referring now to FIGS. 1 and 2 of the drawings, the reference character 10 indicates generally the machine for manufacturing pre-inked dies which embodies the principles of the invention. The machine 10 comprises a supporting frame or cabinet 12 which may include a front panel 14, a back wall 15, a top wall 16, a pair of end walls 18 and a bottom wall 20. The frame 12 houses the electrical power supply 22 (see the electrical wiring diagram in FIG. 7) and the mechanical press 24.

Four upright support members 21 are spaced apart in substantially a square configuration and mounted within frame 12. Preferably, the support members 21 are right angle rods. When the machine is completely assembled, cover 19 extends over and around the support members 21 as shown in FIG. 2. A strip 16' is bent inwardly from back wall 15 toward the back upright support members which are adjacent thereto.

Figure 3:
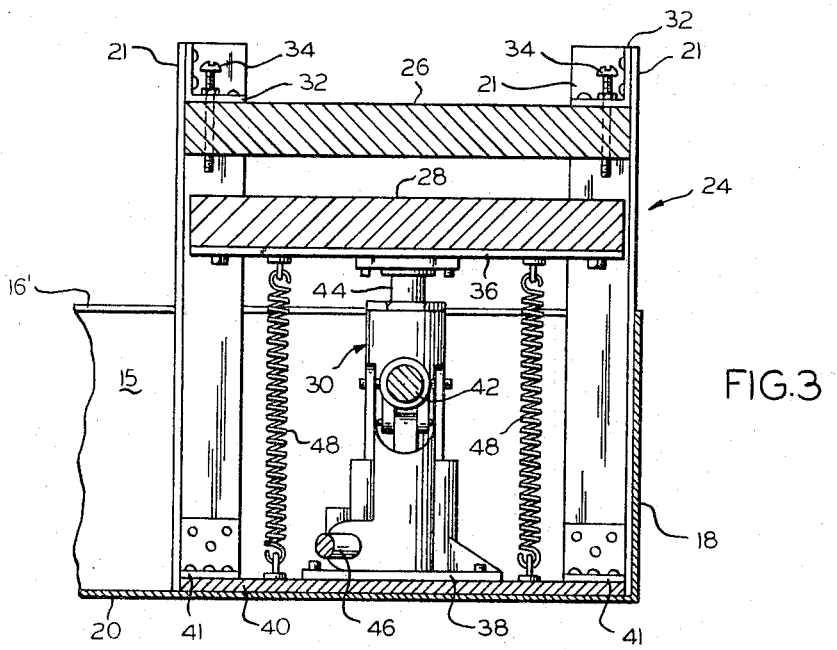
FIG. 3 is a fragmentary enlarged front sectional view taken on the plane of line 3—3 in FIG. 1 viewed in the direction indicated.
Figure 4:
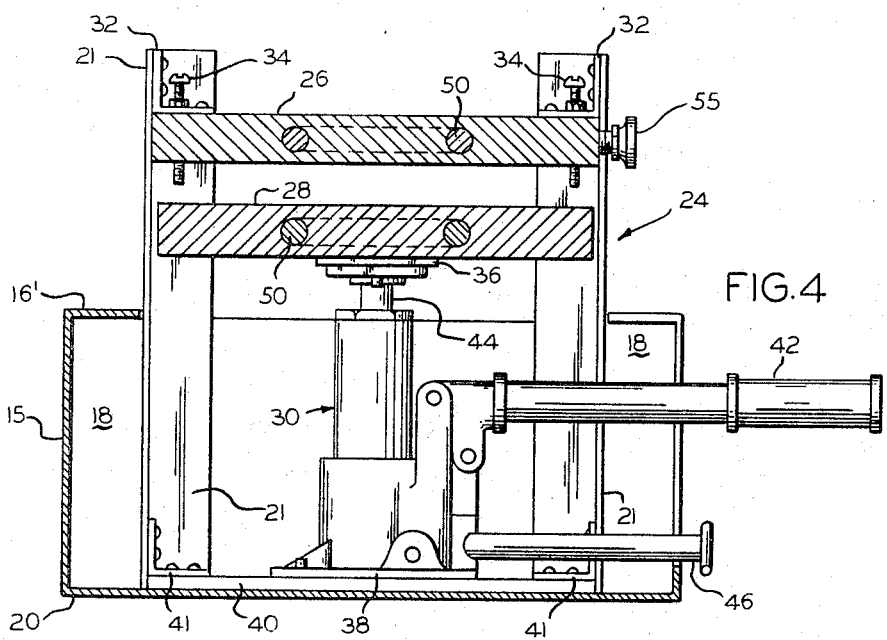
FIG. 4 is a fragmentary enlarged side sectional view taken on the plane of line 4—4 in FIG. 1 and viewed in the direction indicated.

As shown in FIGS. 3 and 4, the mechanical press 24 comprises an upper platen 26 and a lower platen 28 which compress contents placed therebetween under the force provided by jack member 30. The platens 26, 28 may be substantially square shaped and are preferably constructed of a metal which is a good conductor of heat.

The upper platen 26 is rigidly attached by means of right angle brackets 32 to the upright support members 21. Threaded screws 34 are engaged within platen 26 and extend therethrough. The length of the portions of screws 34 which lie between the platens 26, 28 is adjustable and serve as a stop means to vary the minimum distance that the lower platen 28 may approach the upper platen 26.

The lower platen 28 has a cross-sectional area less than the upper platen 26 and is spaced inwardly away from upright supports 21 so that it may move uninhibited in the vertical direction.

Prefrably, jack 30 is of a hydraulic type. Jack 30 includes a top plate member 36 mounted to the lower surface of the lower platen 28. A bottom plate member 38 rigidly attaches jack 30 to a base plate 40 which is in rigid contact with the bottom wall 20 of the frame 12 and the upright support members 21 via the bottom right angled brackets 41. A handle 42 extends out from front panel 14 through opening 43. Opening 43 is elongated in the vertical direction to permit freedom of vertical movement of handle 42. The actuating of handle 42 raises and lowers the neck 44.

Release means 46 controls the pressure valve for jack 30. When rotated to its pressure release position, it causes the release of the hydraulic pressure and permits lower platen 28 to be lowered away from upper platen 26.

A resilient means such as a pair of elongated coil springs 48 may be connected between the top plate member 36 and the base plate 40. The coil springs 48 place a restraining force on the lower platen 28 as the same moves in the upward direction and enables small increments of movement to occur upon the raising and lowering of handle 42. In this manner, platen 28 may be lifted more accurately to the desired vertical level. Furthermore, springs 48 urge the platen 28 downward after the hydraulic pressure is released by rotating the release means 46.

Heating means are included in the upper and lower platens 26, 28. The heating means, as shown in FIGS. 1 and 4, may comprise a pair of substantially circular heating elements 50 positioned in each platen. Preferably, these heating elements are constructed of a material that heats quickly to a high temperature and the heat dissipation therefrom is reasonably controlled electrically.

The heating elements 50 receive their electrical power from the power supply 22 (see FIG. 7). As shown in FIG. 4, a temperature gauge 55 is associated with the upper platen 26 to indicate the temperature of the same. Since the heating elements 50 are substantially the same in both platens 26, 28, a single temperature gauge coupled to either of the platens should suffice. However, where extremely accurated temperature readings are necessary, a temperature gauge for each platen would be required.

Referring to FIG. 1, a hot plate 60 is fixedly mounted by attachment means such as screws 62 to the top wall 16 of the cabinet 12 and may be rectangularly shaped as shown. Hot plate 60 is constructed of a metal that heats extremely quickly to a relatively high temperature for thoroughly heating the same.

The heating means for heating the hot plate 60 may, as shown in FIGS. 1 and 2, comprise four elongated heating elements 64. Similar to heating elements 50, heating elements 64 are constructed of a material which dissipates a large amount of heat with the dissipation therefrom reasonably controlled electrically. The heating elements 64 are inserted within hollow slots 65 of the hot plate 60 to minimize heat loss and to insure the immediate transfer of the heat to the hot plate 60. Electrical wires 66 extend out from the hot plate 60 and into cabinet 12 through openings 67. A temperature gauge 68 (see FIG. 2) indicates the temperature of the hot plate at any given time.

Referring now to FIG. 7 of the drawing, the wiring diagram therein illustrates the electrical connections for supplying the electrical power to the heating elements 50, 64 of the platens 26, 28 and the hot plate 60 respectively. Referring also to FIG. 2, the main switch 70 controls the "on-off" of the electrical power to the rest of the system. When main switch 70 is in the "on" position, power is delivered from the power source 71 to terminals 72 and 74 of rheostat 76. The altering of the position of arm 78 along the resistance between terminals 72, 74 of rheostat 76, by revolving knob 78, serves as a voltage regulator and varies the voltage impressed across terminals 80 and 81 of hot plate 60 via the "on-off" switch 82 and across terminals 83 and 84 of the platens 26, 28 via the "on-off" switch 85. Rheostat 76 may either vary the voltage simultaneously or individually across hot plate 60 and the platens 26, 28 depending whether one or both of the "on-off" switches 82, 85 are in their "on" or "off" position. Whenever any of the switches are turned to their "on" position, a lamp electrically associated with the switch is turned on. The lamps corresponding to the switches are indicated by the same numeral as the switch but with a prime (') designation (see FIG. 2).

Rheostat 76 may have numerical designation on the outside thereof as shown in FIG. 2 to represent a corresponding voltage across a heating element or an approximate temperature of either the platens 26, 28 or hot plate 60.

A timer 88 is mounted to the front panel 14 for timing the necessary steps in producing the pre-inked dies, etc.

With reference to FIG. 5, a galley 90 having a pair of side walls 91 rigidly mounted to a flat plate 92 is used primarily when making the master mold. The tray 93 shown in FIG. 6 includes side braces 94 formed to a flat sheet 95. Flat sheet 95 may be constructed with a pair of handles 96 to provide ease in handling. Tray 93 is utilized in making the pre-ink die from the master mold.

The machine of the embodiment described above and illustrated in the drawings is adaptable for either making the master mold or the pre-inked die. The manner in which the machine is utilized is discussed in the following description.

When making the master mold, the type which permanently indents the molding sheet of material is locked in a chase in the conventional manner and placed in galley 90. The molding sheet, preferably of Bakelite, is placed on the type. A sheet of metal, preferably stainless steel, is superposed on the molding sheet.

The galley 90, with the type, molding sheet and the stainless steel sheet thereon, is placed on the lower platen 28. The platens 26, 28 are heated to a temperature of 300° F. by turning knob 79 of rheostat 76 to a predetermined position. When the platens are used to heat and compress material, they are referred to as vulcanizing platens and are so designated in FIG. 7. After the platens 26, 28 have been heated to 300° F., lower platen 26 is raised to a level where the molding sheet just touches the type and is held in this position preferably for one and one-half minutes as a pre-heat step.

Lower platen 28 is pressed toward upper platen 26 by activating handle 42 of jack 30 so that the mold material may be impressed with the characters on the type. Preferably, the platens are kept in this position for a period of seven minutes.

When the seven minutes have elapsed, the lower platen 28 is lowered by jack 30 so that the type may be removed. The indented molding material is returned to the vulcanizing lower platen 28. Then the lower platen 28 is raised upwardly until the upper platen is in intimate contact with the mold. The mold remains in this position for a final cure for preferably fifteen minutes. After cooling, the mold formed in the aforestated manner is used as a master mold for the pre-inked die.

By way of example only the thickness of the material used in producing the master mold may be as follows: The galley thickness .062 inch, type thickness 0.918 inch, the Bakelite mold material thickness 0.205 inch and the sheet material .015 inch. Bearer side blocks in this example may be used which are 1.143 inches for bracing the sheets within the galley 92. In the above described seven minute impression step, the lower platen is preferably raised until the 1.143 inch bearer side blocks are locked into place. After the impression step, the Bakelite mold is compressed from 0.205 inch to approximately 0.190 inch.

In the final cure step the 1.143 inch bearer side blocks are preferably replaced with .185 inch bearer side blocks. The lower platen 28 is raised until the .185 inch bearer blocks are locked into position.

To manufacture the pre-inked dies, it is initially necessary to pre-heat the hot plate 60 to a temperature 275° F. by rotating knob 79 of rheostat 60 to a pre-determined position. Temperature gauge 68 may be referred to for accuracy of the rheostat setting. The face or surface of the master mold is heated on hot plate 60 to a temperature which is sufficient to fuse die material placed in face to face contact. The temperature, though, of the structure defining the indentation within the master mold should have little, if any fusing effect upon the die material that will come in contact therewithin.

The heated surface of the mold material should be placed on tray 95 facing a slab of pre-inked material. Tray 95 is inserted between the platens 26, 28 and compressed therebetween for two minutes.

After the two minute interval, the new die and master mold are pulled apart. The die which has been thusly produced may be cut into smaller squares and filled with ink. Preferably, three strokes of ink are placed on the lettered surface of the die and the die is then inverted and three additional strokes of ink are applied to the back surface. One brush stroke is applied to each edge. Afterwards, the die is cemented to a mount and used as an ink stamp.

The thicknesses of the slab of die material and the Bakelite mold may vary from time to time. To accommodate these differences it is necessary to adjust the length of the portions of bearer screws 34 extending between the platens 26, 28. For an example, if the thickness of the slab die material is 0.375 inch and the thickness of the master mold is 0.150 inch with character indentations of .0625 inch therewithin, the portion of the bearer screws 34 extending between the platens should be set at sixty percent of the total thickness which is sixty percent of 0.525 inch or 0.315 inch. This setting has been found to provide the optimum pressure for producing the die. It is extremely important to maintain an accurate ratio of material thickness to pressure. In most cases, the sixty percent of the total thickness of materials has been found to be an acceptable rule of thumb for maintaining the proper pressure when the ratio of the thickness of the slab material and master mold material, having .0625 character indentations, are in the range of the preceding example.

From the foregoing description and drawings, it should be apparent that I have provided a novel machine for manufacturing pre-inked dies of greatly simplified and improved construction which accomplishes the aforestated objects and features in a remarkably unexpected fashion. The hot plate 60 which thoroughly heats the outer surface of the mold only and not the indentations below the surface enables a porous pre-inked die to be produced without the necessity of placing the porous slab of material into a molten state.

It is believed that my invention, its mode of construction, assembly and many of its advantages should be readily understood from the foregoing without further description and it should also be manifest that while a preferred embodiment of this invention has been shown and described for illustrative purposes, the structural are nevertheless capable of wide variation within the purview of my invention as defined in the appended claims.

What I claim and desire to secure by Letters Patent of the United States is:

1. A machine for manufacturing pre-inked dies comprising; a frame; an upper and lower platen positioned in an opposed relationship, said upper platen being rigidly connected to said frame; a jack rigidly connected to said lower platen for moving the same toward and away from said upper platen to form a pre-inked die from a master mold and a slab of die material inserted together between said platens; one of said platens including an adjustable stop means for regulating the minimum distance said movable platen can be spaced apart from the other whereby the pressure applied by said platens to said master mold and slab material can be correspondingly changed; heating means associated with each of said platens for heating the same when constructing a master mold; a hot plate rigidly connected to said frame and positioned adjacent said platens, said hot plate being constructed of material that heats quickly and evenly to a relatively high temperature for thoroughly heating only the face of said master mold placed in contact therewith during a predetermined period immediately prior to the inserting of the same between said platens; a heating element associated with said hot plate for heating the same; and an electrical power supply for supplying electrical power to heating means and said heating element.

2. A machine, as defined in claim 1, wherein a temperature gauge is coupled to said hot plate to provide the temperature reading for said high temperature and a timer is associated with said hot plate to indicate said pre-determined period for thoroughly heating only the face of said master mold, said jack having a handle whereto an external force is applied for moving said movable platen toward said other platen, said jack including a release means for reversing the direction of said jack to move said movable platen away from said other platen.

3. A machine as defined in claim 1, wherein a spring is biased in the downward direction to restrain the travel of said movable platen toward the other of said platens and cause thereby incremental level changes when said external force is applied to said jack, said spring also urging said movable platen downward away from the other after said release means is activated, said one adjustable stop means and said spring cooperating to control the pressure being applied to said master mold and said slab of die material.

4. A machine for manufacturing pre-inked dies comprising:
  a frame;
  an upper and lower platen positioned in an opposed relationship, said upper platen being rigidly connected to said frame;
  a jack rigidly connected to said lower platen for moving the same toward and away from said upper platen to form a pre-inked die from a master mold and a slab of die material inserted together between said platens;
  at least one threaded screw threadedly engaged to said upper platen and having an end portion thereof extending between said platens, said one threaded screw being adjustable to vary the length of said end portion for regulating the minimum distance said platens can be placed apart whereby the pressure applied by said platens to said master mold and slab of material is correspondingly changed;
  heating means associated with each of said platens for heating the same when constructing a master mold;
  a hot plate rigidly connected to said frame and positioned adjacent said platens, said hot plate being constructed of material that heats quickly and evenly to a relatively high temperature for thoroughly heating only the face of said master mold placed in contact therewith during a predetermined period immediately prior to the inserting of the same between said platens;
  a heating element associated with said hot plate for heating the same; and
  an electrical power supply for supplying electrical power to heating means and said heating element.

5. A machine, as defined in claim 4, wherein said heating means and said heating element are positioned within said platens and said hot plate respectively to cause immediate heat transfer thereto.

6. A machine, as defined in claim 4, wherein the power from said power supply is controlled by an on-off power switch for said heating means, an on-off power switch for said heating element, and a rheostat for varying the current flow either simultaneously or separately through said heating means and said heating element as determined by the position of said power switches.

7. A machine, as defined in claim 4, wherein temperature gauges are coupled to at least one of said platens and said hot plate to provide continuous temperature readings of the same, a timer is associated with said hot plate and said platens to indicate pre-determined temperature heating periods, and a spring is biased in the downward direction to restrain the travel of said movable platen toward the other of said platens to cause thereby incremental level changes when force is applied to said jack, said one adjustable screw and said spring controlling the pressure being applied to said master mold and said slab of die material.

8. A machine for manufacturing pre-inked dies comprising:
  a frame, said frame including a cavity, a vertically extending opening in said frame communicating with said cavity;
  an upper platen rigidly connected to said frame within said cavity and positioned in an opposed relationship with respect to said upper platen;
  a lower platen movably associated within said cavity of the frame in an opposed relationship with respect to said upper platen;
  a hydraulic jack rigidly connected to said frame and said lower platen for moving said lower platen toward and away from said upper platen to form a pre-inked die from a master mold and a slab of material inserted together between said platens, said jack including a jack handle reaching through said vertical opening of the frame for vertical movement therein to raise said lower platen and a release means for reversing the direction of said jack to move said lower platen away from said upper platen;

a plurality of threaded screws threadedly engaged within said upper platen and each having an end portion thereof extending between said platens, said threaded screws being adjustable to vary the length of said end portion for changing the pressure applied by said lower platen to said master mold and said slab of material;

a spring biased in the downward direction to restrain the travel of said movable platen toward the other of said platens to cause thereby incremental level changes when force is applied to said jack;

heating means positioned within each of said platens to cause immediate heat transfer to the same when constructing a master mold;

a hot plate rigidly connected to said frame and positioned adjacent to said platens, said hot plate being constructed of material that heats quickly and evenly to a relatively high temperature for thoroughly heating only the face of said master mold placed in contact therewith during a predetermined period immediately prior to the inserting of the same between said platens;

a heating element positioned within said hot plate to cause immediate heat transfer to the same;

electrical power means including a power source effectively in series with a rheostat, said heating means and said heating element being effectively in parallel with each other and said series connection of said power source and said rheostat, a first on-off power switch controlling the power to said rheostat, a second and third on-off power switch controlling the power to said heating means and said power heating element, said rheostat varying the current flow either simultaneously or separately through said heating means and said heating element as determined by the position of said power switches;

temperature gauges coupled to at least one of said platens and said hot plate to provide continuous temperature readings of the same; and a timer associated with said hot plate and said platens to indicate pre-determined temperature heating periods.

References Cited by the Examiner

UNITED STATES PATENTS

| | | | |
|---|---|---|---|
| 864,195 | 8/1907 | Rodwell | 18—17 |
| 1,206,093 | 11/1916 | Chapman. | |
| 1,357,343 | 11/1920 | Novotny. | |
| 1,417,993 | 5/1922 | Heeren | 18—17 |
| 1,597,898 | 8/1926 | Jegge | 18—17 |
| 1,874,698 | 8/1932 | De Turk | 18—17 |
| 2,173,086 | 9/1939 | Dinzl | 18—17 X |
| 2,197,528 | 4/1940 | Makenny et al. | 18—17 |
| 2,373,201 | 4/1945 | Smith | 18—17 |
| 2,509,783 | 5/1950 | Richardson | 18—16 X |
| 2,521,282 | 9/1950 | Butler | 18—17 |
| 2,896,197 | 7/1959 | Weisenberger | 18—17 X |
| 2,927,620 | 3/1960 | Elliott | 18—17 X |
| 3,089,188 | 5/1962 | Hoffmann | 18—17 X |

J. SPENCER OVERHOLSER, *Primary Examiner.*

J. HOWARD FLINT, JR., *Examiner.*